June 25, 1968 R. A. HEISLER 3,389,669
EAR SHAPING APPARATUS
Filed Sept. 1, 1966 6 Sheets-Sheet 1

INVENTOR.
RAYMOND A. HEISLER
BY
Ralph R Roberts
AGENT.

INVENTOR.
RAYMOND A. HEISLER
BY
Ralph R. Roberts
AGENT.

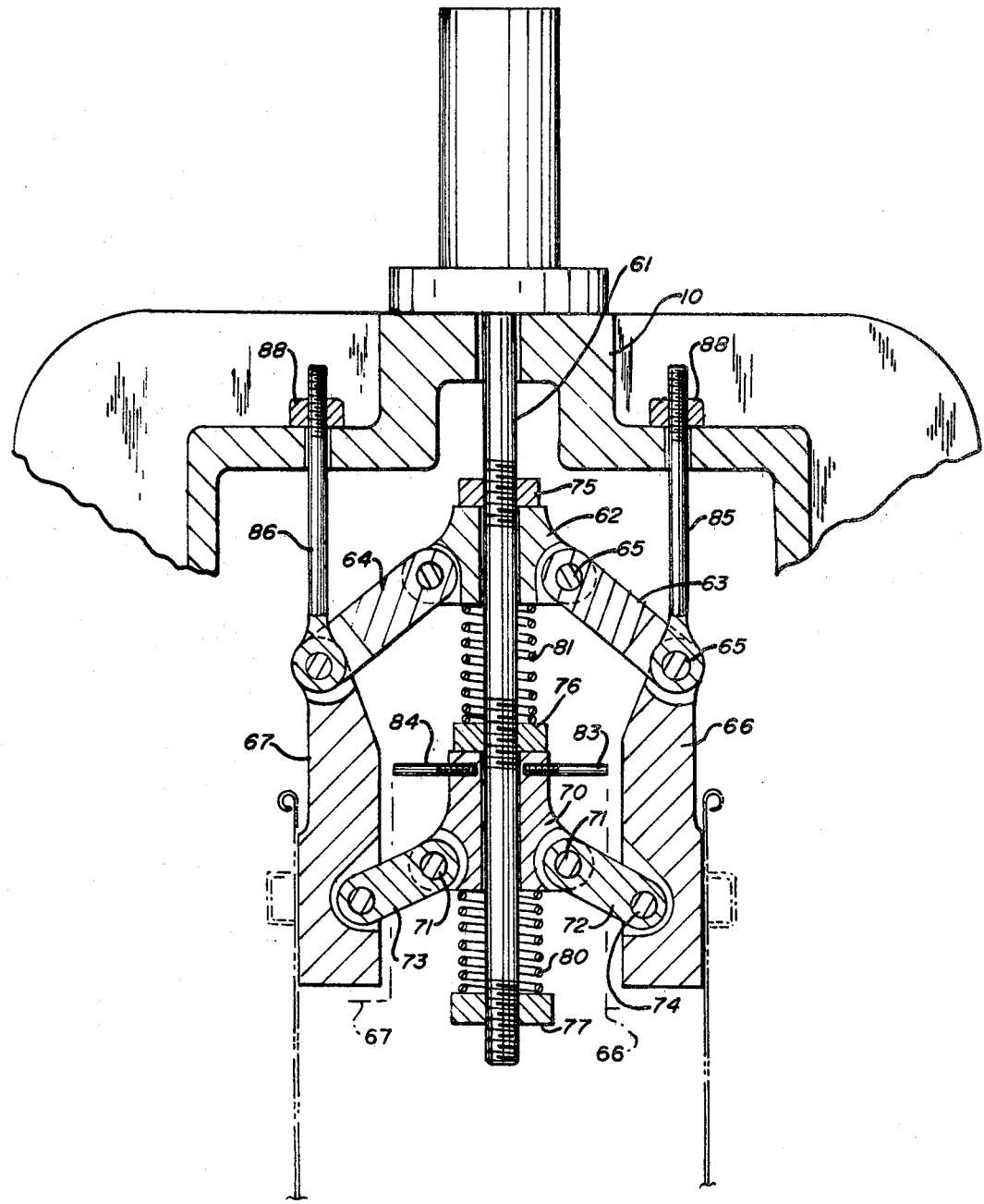

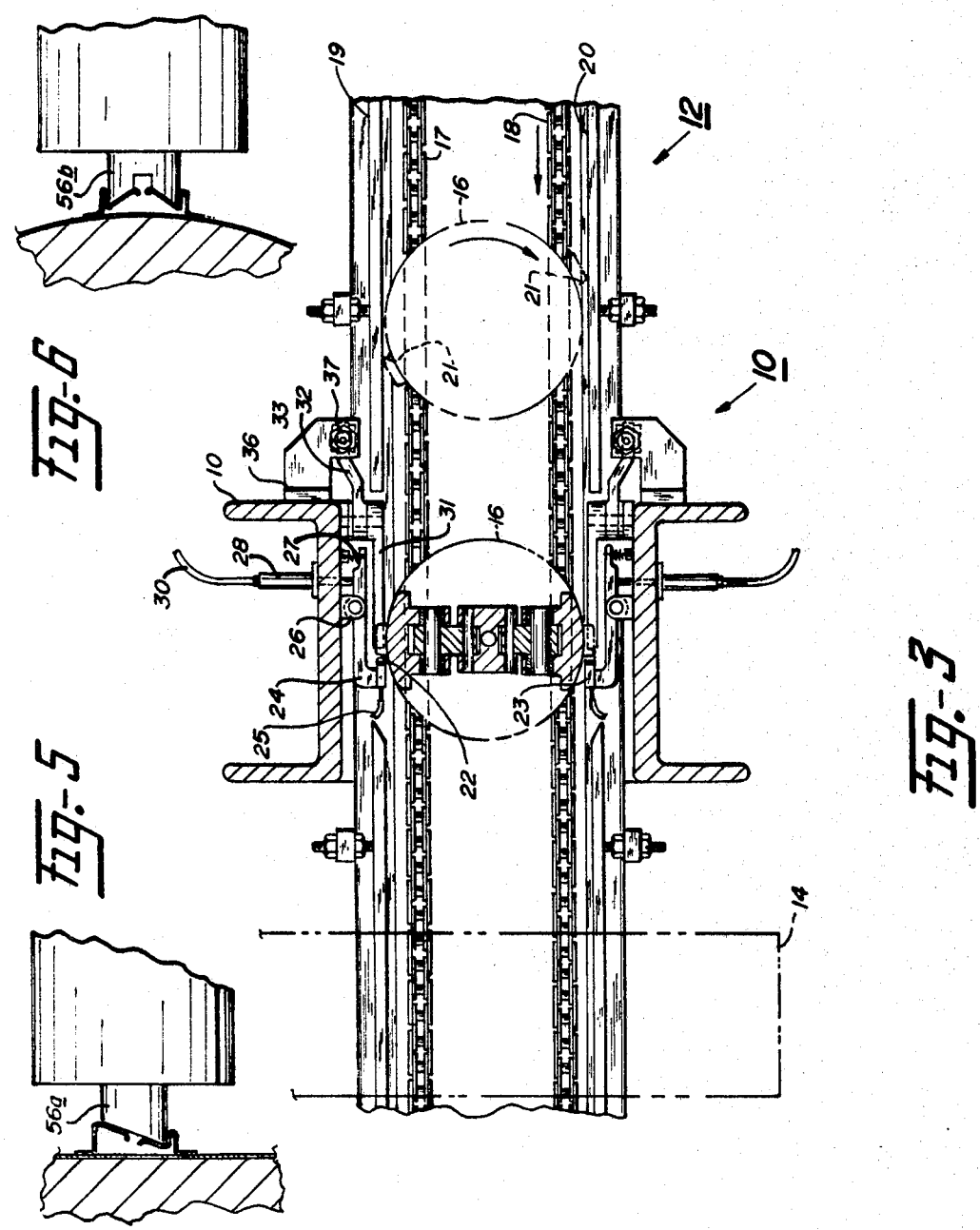

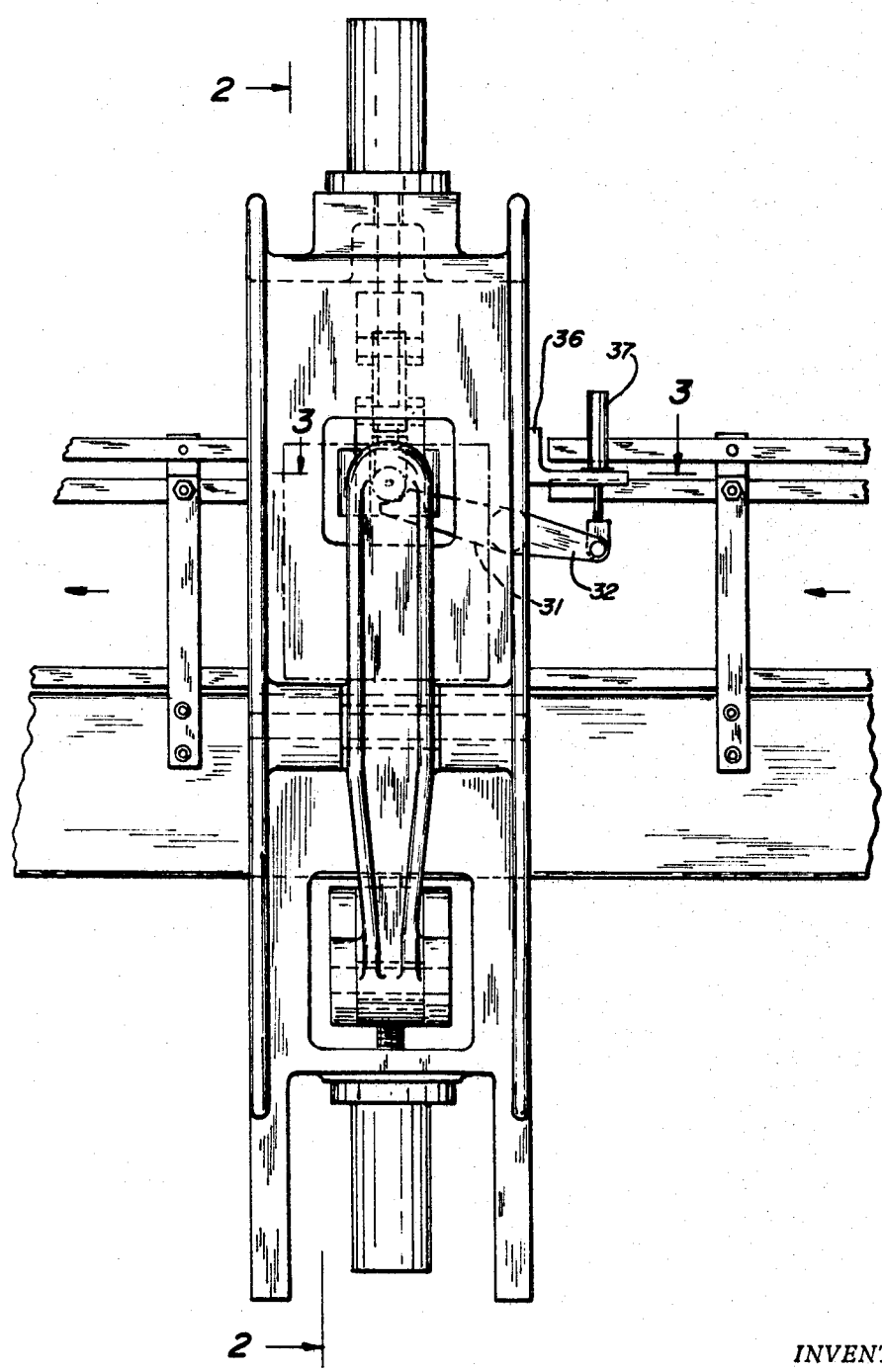

June 25, 1968  R. A. HEISLER  3,389,669
EAR SHAPING APPARATUS
Filed Sept. 1, 1966  6 Sheets-Sheet 6
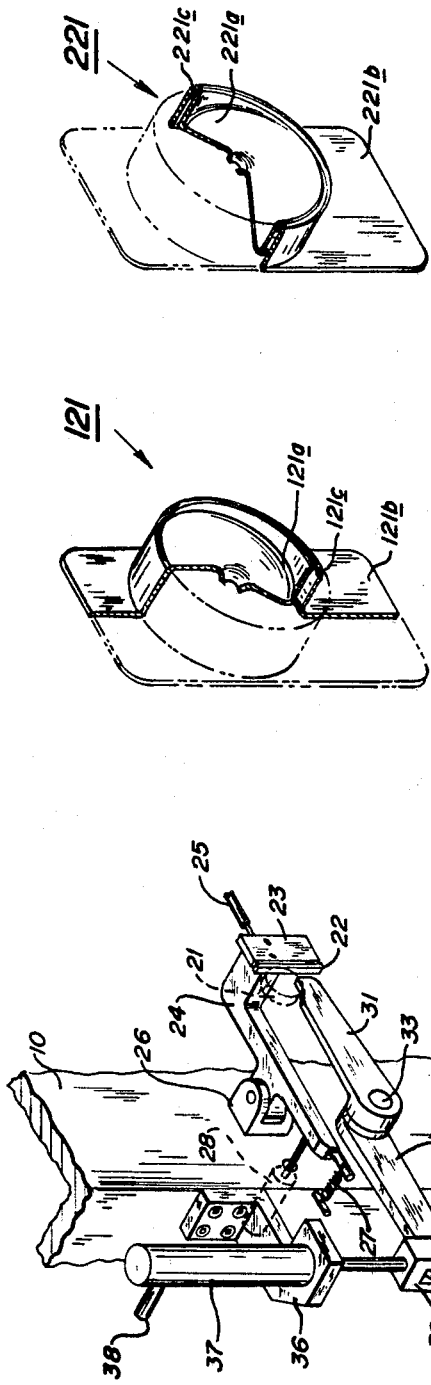
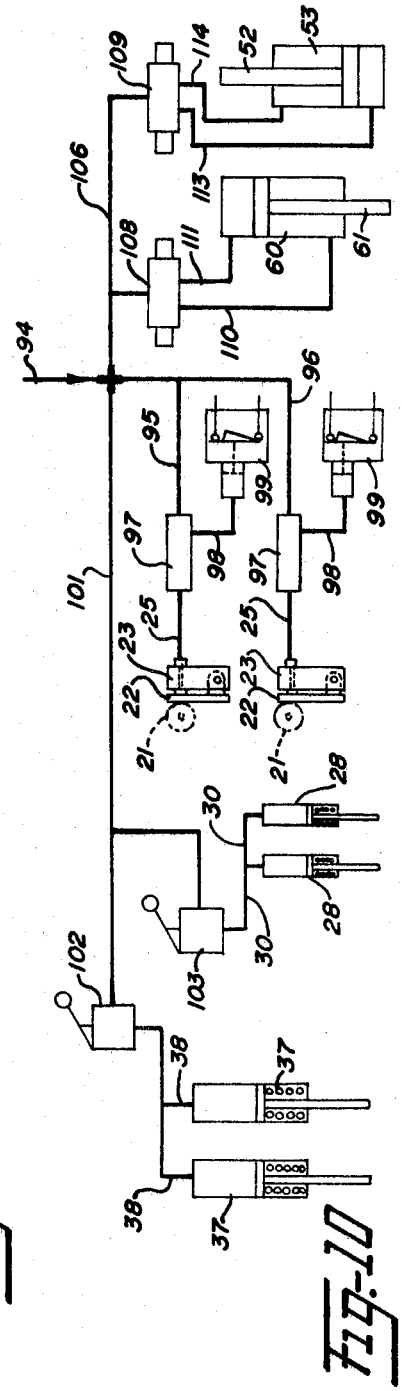
INVENTOR.
RAYMOND A. HEISLER
BY
Ralph R. Roberts
AGENT.

United States Patent Office 3,389,669
Patented June 25, 1968

3,389,669
EAR SHAPING APPARATUS
Raymond A. Heisler, 657 Dakota Trail,
Franklin Lakes, N.J. 07417
Filed Sept. 1, 1966, Ser. No. 576,651
16 Claims. (Cl. 113—1)

ABSTRACT OF THE DISCLOSURE

The method and apparatus of this disclosure contemplates the feeding or transporting of eared containers on a conveyor of the type shown in my U.S. Patent 3,241,578 issued Mar. 22, 1966. Encompassing this conveyor is a frame having a pair of ear stops movable into and away from the path of the ears. These stops are provided with a sensing means which are adapted to be engaged by the ears of the advancing container and in response thereto to cause a cycle of operation to be performed by the apparatus. A pair of lifting arms engage the ears and by a cradling means engage these ears to lift the container to a predetermined height and position whereupon a pair of oppositely disposed reshaping dies are advanced to and beyond the first originally-formed surface of the ears. At the same time, the container is being lifted to the reshaping station, a bolster is moving into the interior of the container and is expanded so as to tightly engage and support the wall of the container at least at those portions of the container where the ear is attached. After the ears have been reshaped the dies are moved away from the container; the bolster is collapsed and moved from inside the container; the lift arms are lowered to bring the container to the conveyor, and the stops are moved from in the way of the ears whence the container is moved from the apparatus. A more complete description of the preferred embodiment and method is provided in the description to follow.

---

This invention relates to an apparatus for and the method of shaping ears already attached to eared containers.

In particular, this invention relates to the apparatus for and the method of reshaping the ears of a previously eared container, said ears being reshaped in a predetermined manner adapted to receive and retain a wire bail having ends particularly formed to cooperate with the reshaped ear to produce a shift of relationship of the bail to the side of the container as the bail is rotated in the ears of the container.

Even more particularly this invention relates to precisely reshaped ears having final configurations providing portions with ramps, cam surfaces and the like, said shapes being generally of a type such as is illustrated in the ears shown in U.S. Patents 3,202,392 and 3,170,593 said reshaping being provided by apparatus having means to receive an eared container and by engagement of these ears to orient the container at a predetermined position. After orientation and in response to a signal the apparatus is caused to lift the container by its ears to a position adjacent a pair of oppositely disposed reciprocable die forms and and while these die forms are being advanced toward and into the ears an internal bolster is moved into internal support of the container wall. In this manner the ears are reshaped by the dies after which the dies and bolster are removed from the container and the container is lowered and released for further operations.

Even more particularly this invention relates to a method for reshaping the ears on a previously eared container which method includes the steps of advancing an eared container into ear reshaping means; orienting the container by its ears so that the container and its ears are disposed at substantially determined positions; engaging and lifting the container by its ears so that the ears are brought precisely in the way of ear reshaping dies; advancing ear reshaping dies to and beyond the first originally-formed surface of the ears; supporting the walls of the container at least at those portions having the ears mounted thereon; and releasing the container with the reshaped ears for other operations and use.

Background of the invention

The present invention relates to a method and means for providing eared containers with ears reshaped into a precise configuration and with the shape particularly oriented in a fixed relationship to the axis of the container. It is noted that U.S. Patents 3,202,311, 3,170,592 and 3,170,593 and many others of like scope all illustrate ears having particular cooperative relationships to bails having specific end shapes. Heretofore an objection to providing eared containers with a specially shaped or nonsymmetrical ear is the difficulty of providing apparatus having the ability to store, feed, position and attach with a high degree of reliability a pre-shaped ear in a precise location and orientation to the container. As standard container fabricating lines operate at speeds of a hundred or more containers per minute the apparatus for providing a high-speed precise attaching means for the non-symmetrical ears is at present unknown and if and when developed would needs be a sophisticated and rather complex piece of apparatus. Apparatus of this type would also be specific to the ear shape desired and would provide no ready size of configuration exchange or change.

It is an object of this invention to provide an apparatus adapted to receive an eared container; to orient the container by its ears; to stop and lift the container by its ears into a precise position whereupon reshaping die means engages the ears and reshapes the ears to a desired configuration. After the reshaping has been completed the container is released from the apparatus.

It is a further object of this invention to provide an apparatus and method for reshaping the ears of a container in which the apparatus is adapted to encompass a conveyor so as to receive eared containers as they are transported and to engage and precisely position these containers as die reshaping means is actuated to reform the ear whereupon the eared container is released for further transport.

It is a further object of this invention to provide an apparatus in which the die reshaping means is readily removable for repair or change to another die which may be of a different configuration.

It is a further object of this invention to provide apparatus for reshaping the ears of a container in which the apparatus includes a movable stop adapted to engage the ears of an advancing container and upon engagement to sense the ears and actuate the apparatus so that lift arms will engage the ears and lift the container to a precise location.

It is a further object of this invention to provide apparatus in which during the lifting and reshaping operations a bolster is moved into the container and is expanded to engage and support the walls of the container as the ears are reshaped by the ear reshaping dies.

It is a further object of this invention to provide a method in which an eared container is received, oriented, lifted into reshaping position, has its ears reshaped by reciprocably moved dies and then the container is released and delivered from the reshaping means.

There has thus been outlined rather broadly the most important features of the present invention in order that a detailed description thereof that follows may be better understood and in order that the present contribution to the art may be better appreciated. There are, of course, additional features of the invention that will be described hereafter and which will form the subject of claims appended hereto. Those persons skilled in the art will appreciate that the conception on which the present disclosure is based may readily be utilized as the basis for designing other structures for carrying out the several purposes of this invention. It is important, therefore, that the claims be regarded as including such equivalent constructions as do not depart from the concept and scope of this invention.

A specific embodiment of the invention has been chosen for purposes of illustration and description, and is shown in the accompanying drawings forming a part of the specification wherein:

FIG. 2A represents an enlarged view partly in section and showing in greater detail and at the moment of expansion, the components forming the bolster mechanism shown in FIG. 2;

FIG. 3 represents a plan view, partly schematic and partly in section with the bolster mechanism expanded and looking in the direction of the arrows 3—3 of FIG. 4;

FIG. 4 represents a side view of the apparatus and looking in the direction of the arrows of FIG. 1;

FIG. 5 represents in enlarged scale a fragmentary side view partly in section and showing a reforming die and an ear on a portion of a container;

FIG. 6 represents in enlarged scale a fragmentary plan view partly in section and showing a reforming die and an ear on a portion of a container;

FIG. 7 represents a fragmentary isometric view showing in greater detail the preferred ear stop sensing means and lifting apparatus of this invention;

FIG. 8 represents an isometric view partly in section and showing in detail a typically reshaped ear;

FIG. 9 represents an isometric view partly in section and showing in greater detail yet another form of reshaped ear; and FIG. 10 represents a circuit diagram which may be used for cycling the operation of the ear reshaping apparatus.

Figure 1:
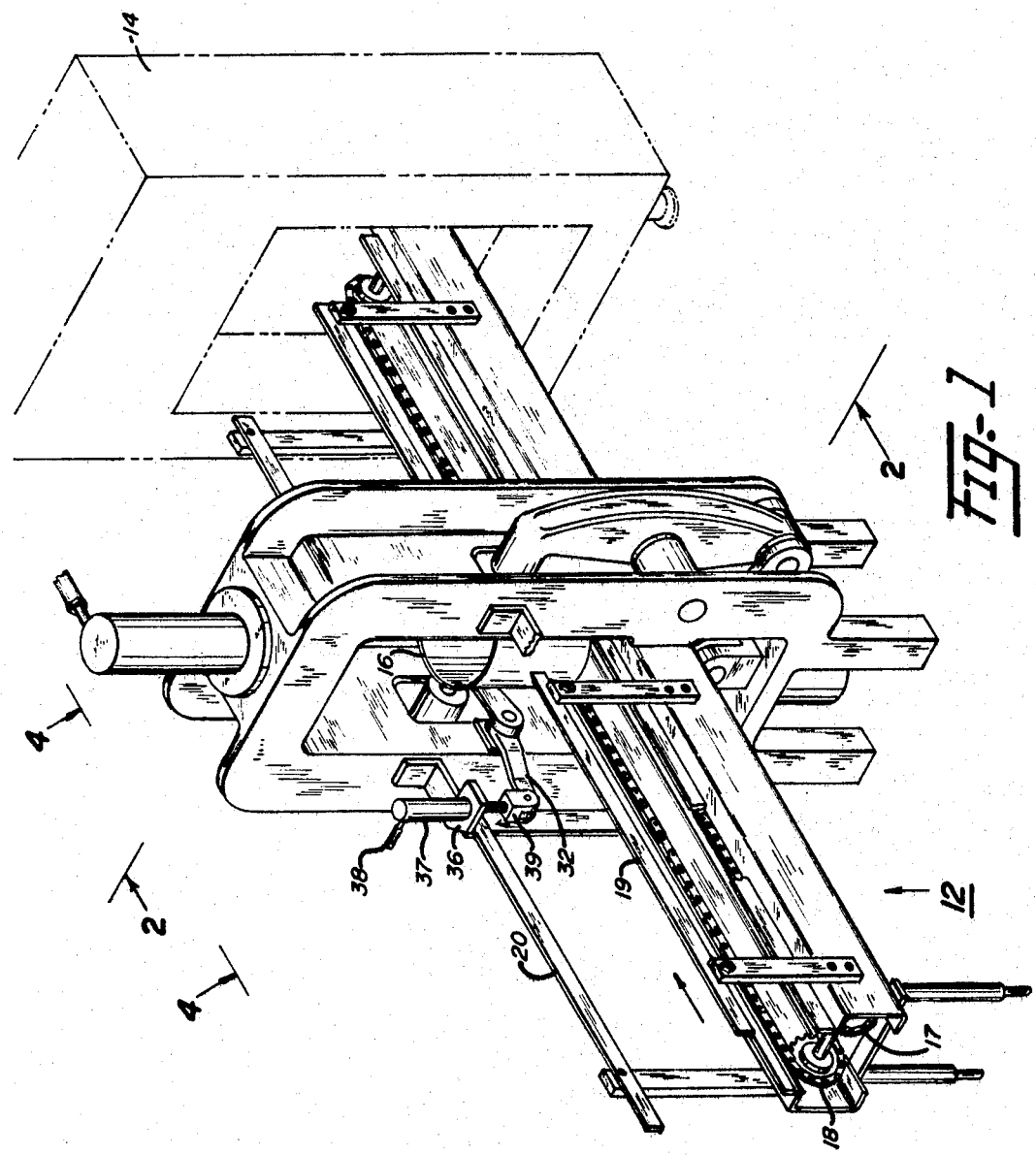
FIG. 1 represents an isometric view of an ear-reshaping apparatus of this invention and disposed so that a conveyor of a processing line passes through the apparatus.
Figure 2:
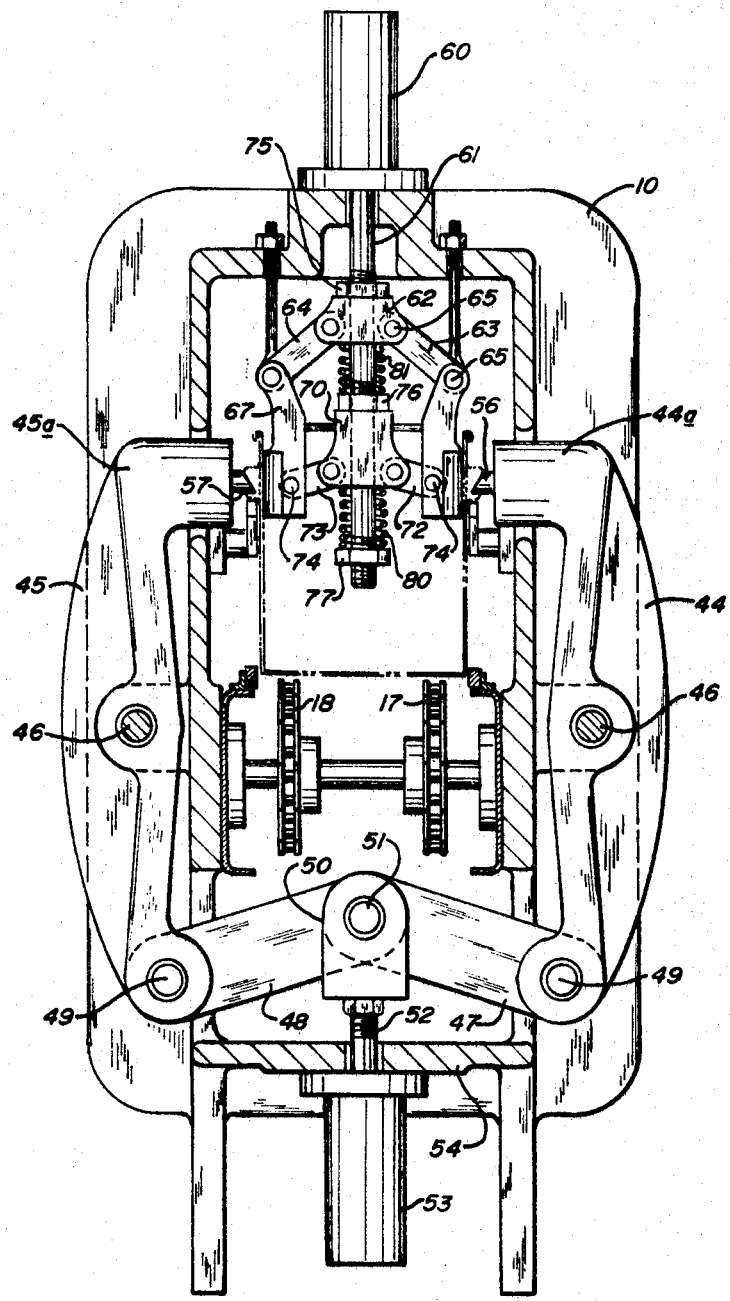
FIG. 2 represents a view partly in section and showing in particular the ear reshaping means and the container transporting and lifting means, the view being taken on the line 2—2 of FIGS. 1 and 4.

Referring now more particularly to the drawings wherein similar characters designate corresponding parts throughout, the general arrangement of the components forming the preferred embodiment of the ear reshaping apparatus of the present invention is shown in FIGS. 1 through 4 in which is included a frame 10 having an opening therethrough in which a conveyor 12 similar in nature and use as to the conveyor shown and described in my U.S. Patent 3,241,578 is used to transport containers having ears thereon. This conveyor is contemplated as extending perhaps to a bail-applying mechanism as for example shown in dashed outline and designated 14, this bail-applying mechanism being the same or similar to the one described in the above identified U.S. patent. Carried by and upon this conveyor is a container 16 which may be of one, two or five gallon capacity and having a pair of ears attached thereto. The container being fed in the present instance to the ear reshaping apparatus has its open end disposed upwardly and with the lid or cover removed during the reforming of the bail ears. As shown in FIGS. 1, 2 and 3 this conveyor preferably includes conveying chains 17 and 18 which chains have one traveling at a faster rate than the other and as exemplified has the chain 18 traveling at a faster pace than chain 17 so as to impart a rotating motion to the advancing container 16. Guide rail 19 and ear contacting rail 20 are disposed in the manner and for use as described in the above identified U.S. patent and form no part of this invention as the container may be advanced into this apparatus by other than the conveying and orienting device herein illustrated.

Referring now in particular to FIGS. 3 and 7 it is to be noted that the advancing container as it is brought in the way of the inner portion of the apparatus has its ears oriented in the plane of the frame 10 so that as the container 16 is advanced to the center part of the apparatus the ears 21 on the container come in the way of ear sensing plate 22 pivotally mounted upon an arm end 23 which is attached to an outwardly extending portion of a pivoted arm 24. Attached to and leading from the arm end 23 is a pneumatic conductor 25 which conductor extends to a sensing and actuation device to be hereinafter described. Arm 24 is carried by a pivot block 26 and in a manner so that the arm end 23 may be moved into or away from the path of the ears of the incoming container 16. A spring 27, as exemplified, is a tension spring adapted to swing the arm end 23 into the path of the incoming ear 21. Mounted upon the frame 10 is a pneumatic cylinder 28 having its piston rod extending through the frame and against the arm 24, said end disposed to engage the arm between the pivot 26 and the spring end 27 and when actuated to push the arm end 23 from the path of the ear. Attached to and extending from this pneumatic cylinder 28 is a pneumatic conductor 30 for a use to be more fully described hereinafter.

Adapted to act in concert with the arm 24 is an ear lift mechanism which includes an inner arm 31 and an outer arm 32 pivotally mounted upon a pivot pin 33 extending from the frame 10. These arms are coupled to each other by means not shown, the coupling insuring that each arm moves exactly in response to the other. Carried upon a bracket 36 attached to the frame 10 is a pneumatic cylinder 37 which preferably is of the spring-return type. Attached to and extending from the upper portion of the cylinder is a pneumatic conductor 38. This conductor will be more fully described in connection with the operation of the cylinder 37 and in conjunction with a circuit diagram to be hereinafter described. It is to be noted that the piston rod of cylinder 37 is connected by clevis end 39 to the arm 32 so that as the piston rod is reciprocated the arm 32 is moved in a manner so that distal end of the inner arm 31 is moved to engage, lift and support the ear 21.

Referring now in particular to FIG. 2 it is to be noted that frame 10 has pivotally mounted therein a pair of cam arms 44 and 45. As exemplified, these arms are preferably steel forgings or castings each being pivoted intermediate their ends and are supported by means of pivot pins 46 extending between and carried by ribs of the frame 10. The lower portion of these arms as viewed in FIG. 2 are connected to links 47 and 48 by means of pivot pins 49. The inner ends of links 47 and 48 are mounted within an end of a clevis 50 and by means of pin 51 are connected to and made movable with the clevis 50. The other end of this clevis has a threaded hole formed and adapted to receive a threaded end of piston rod 52 carried by piston 53. This piston 53 is carried by and is rigidly mounted to a cross-rib 54 extending between oppositely disposed side beam and support portions of the frame 10. The piston rod 52 as it is moved up and down in response to a signal to be hereinafter described, moves links 47 and 48. As they are moved the links 47 and 48 proceed from a lower limit at or near a horizontal position which is at substantially right angles to the arms 44 and 45 and as they are moved upwardly toward the upper limit they cause the angle between the links and the arms to become less whereupon the lower ends of the arms 44 and 45 are swung towards the piston rod 52. At this upper limit condition of the piston 53 the cans or containers 16 are caused to be advanced into and stopped in the frame 10 by sensing plate 22 engaging ear 21 and the ears engaged and lifted. The piston within cylinder 53 is then caused to be moved downwardly causing the arms 47 and 48 to approach a position shown in FIG. 2 wherein the upper ends of arms 44 and 45 are moved toward the container and by means of engagement with the removable dies 56 and 57 the ears are caused to be reshaped.

It is contemplated that the container 16 is made of conventionally thin metal material so that the walls of this container in themselves are not sufficiently rigid to withstand the impact of the dies 56 and 57. For this reason a bolster means is provided so as to aid a positive support to the walls of the container 16. This bolster is actuated preferably by pneumatic means and in response to a timing mechanism hereinafter described, which timing mechanism may be of any commercial design and construction. The preferred bolster apparatus herein shown and described includes a cylinder 60 fixedly mounted upon the upper bridge or cross-tie portion of frame 10 and having a piston rod 61 extending through this upper cross-tie of the frame. Upon the lower portion of this piston rod 61 there is mounted an upper link retaining member 62 which link retaining member is slidably mounted upon the piston rod 61. Upon the lower depending portion of the link retaining member 62 there is formed clevis portions adapted to receive the upper ends of links 63 and 64 which are retained in pivotable relationship to link 62 by means of pins 65. Like pins 65 are mounted in the other ends of the links 63 and 64 and are connected to bolster members 66 and 67 which bolster members have their outer surfaces formed into circular segments adapted to engage and support the inner diameter of the container 16. Slidably carried on the lower or outer portion of piston rod 61 is a lower pivot block 70 in which a pin 71 pivotally retains each of the inner ends of links 72 and 73. The outer ends of the links 72 and 73 are pivotally retained by means of pins 74 in the respective bolsters 66 and 67.

Referring now particularly to FIG. 2A it is to be noted that immediately above member 62 there is provided an adjustable nut 75 which is disposed at a predetermined distance above the end of the piston rod. Intermediate the link retaining member 62 and pivot block 70 there is also disposed on the piston rod an adjustable nut 76 which is located on the rod so as to be a predetermined distance above the end of the rod. The end of the rod has mounted thereon a retaining nut 77 which nut retains one end of a compression spring 80 slidably retained on the rod and with the other end of the spring engaging the under side of block 70 and urging it upwardly. A compression spring 81 is also retained on rod 61 and is mounted between nut 76 and member 62 and is adapted to urge member 62 upwardly. Adjustably mounted in the pivot block 70 and adapted to engage the respective inner shoulders formed in the bolsters 66 and 67 are stops 83 and 84. A pair of limit arms 85 and 86 are slidably retained in holes formed in the bridge portion of the frame 10. The lower ends of these arms are pivotally retained on pins 65 while the upper ends of the arms are threaded to accept and retain nuts 88 which are adjusted to provide shoulder stop means to limit the downward movement of the arms 85 and 86. The operation of the bolster will be detailed below.

It is to be herein noted that dies 56 may be made of any desired shape and are preferably removably mounted in a precisely oriented position upon the inwardly extending portions 44a and 45a of the arms 44 and 45, said dies being oriented in a predetermined position and being displaced inwardly of the ends of the arm portions 44a and 45a a selected distance.

In FIG. 8 an ear 121 is shown in an enlarged view and partly in cross-section in which a conventionally domed shaped ear 21 is reshaped by a die carried by arm 44 or 45. This die causes the lower part 121a of the ear to be moved toward the flange 121b and as so formed provides a lower ramp for the end of a bail to engage and to be cammed thereby. It is noted that as thus formed this ear has the lower portion formed with a U-shaped wall 121c which accommodates any excess side wall metal displaced in the reshaping process. This ear may be reshaped with a die 56a as seen in FIG. 5.

In FIG. 9 is shown in an enlarged view and partly in cross-section an ear 221 in which a conventionally domed-shaped ear 21 is reshaped by a die carried by arm 44 or 45. Such a die 56b may be seen in FIG. 6, which die is adapted to shape the ear so that the horizontal portions 221a of the ear are bent inwardly toward the flange 221b and as so formed provide a ramp or cam surface for engagement by the end of the bail. As in the reformed ear 121 a wall 221c may be U-shaped in part so as to accommodate any excess side wall metal displaced in the reshaping process.

Referring now to FIG. 10 a schematic diagram is shown providing one means for the operation of the ear reshaping apparatus. From a source of pressurized air indicated as 94, a determined flow through lines 95 and 96 is conducted to a T-connection 97 from which it passes through pneumatic conductor 25 which leads to and through end member 23. The conductor 25 terminates in an open end adjacent the sensing plate 22. This plate is adapted to close the terminal end of the conductor 25 when it is pushed against this end by an ear 21 of the eared container. When the conductor end is closed, the pressure in the now closed line 25 increases to the line pressure. This increased pressure is fed through conductors 98 to pressure actuated switches 99 which are adapted to cause electrical circuits to be closed. Also fed by air supply 94 is supply line 101 which extends to electrically actuated valves 102 and 103. From valve 102 pressurized air is adapted to be fed through conductors 38 to the cylinders 37 which activate the lift arms. From valve 103 pressurized air is adapted to be fed through conductors 30 to cylinders 28. From supply line 94 a conductor 106 carries pressurized air to valves 108 and 109. From valve 108 lines 110 and 111 carry pressurized air to the cylinder 60 which actuates the bolster described above. From valve 109 lines 113 and 114 carry pressurized air to the cylinder 53 which actuates cam arms 44 and 45.

Use and operation

The operation of the above described apparatus contemplates that an eared sheet-metal container 16 which as it is advanced and oriented in the manner above described is brought into engagement with the pneumatic sensing device wherein the ear sensing plates 22 are swung inwardly and into a position to engage the path of the ears 21 and in response to a movement of these plates by the forward motion of these ears to cause a pneumatic signal to be sent to an electrical circuit described in relation to the circuit diagram of FIG. 10. Inner arm 31, moved by expanding cylinder 37, is caused to be lifted to engage the under portion of the ears 21 and by the ears to raise the container to a predetermined position as shown in FIG. 2. It is to be noted that as the container is lifted the container is removed from engagement with the conveying chains 17 and 18. At about the same time the valves 108 and 109 are actuated so that expansion is caused in both cylinders 53 and 60. By circuit control and timing the movement of the cylinder 53 is made slightly in advance of the expansion of the cylinder 60. The piston in cylinder 60 is moved downwardly to cause rod 61 to move downwardly carrying the bolsters as described above. As rod 61 moves downwardly the bolster 66 and 67 are in the closed or inner position being urged into this position by the springs 80 and 81 which move retaining member 62 and pivot block 70 upwardly on rod 61 until stops 83 and 84 engage the inner shoulders or bolsters 66 and 67. As the rod 61 moves downwardly carrying the bolsters 66 and 67 to a position within the eared container the limit arms 85 and 86 reach the lower limit of travel as determined by nuts 88. As the downward travel of the bolsters 66 and 67 is stopped the rod 61 is caused to be moved further downwardly to a position substantially as shown in FIG. 2. Nuts 75 and 76 have engaged member 62 and block 70 moving them downwardly and bolsters 66 and 67 are swung outwardly on arms 63, 64, 72 and 73 and firmly engage the interior of the eared container. After reshaping the ears by means of dies 56 and 57 valve 108 is cycled and the rod 61 is moved upwardlly and the upward movement begins the nuts 75 and 76 move upwardly. The springs 80 and 81 urge member 62 and block 70 upwardly on the shaft and with the weight of the bolsters 66 and 67 urging them downward they collapse and swing inwardly until restrained by the stops 83 and 84. The continued upward movement of the rod 61 causes the collapsed bolster to be lifted from the container a determined amount. At the same time but in response to a slightly different time cycle the container is lowered by arms 31 to the conveying chains 17 and 18.

At the same time the bolster action and the lift action is being performed a signal in times sequence is being sent to valve 109 which then causes pressurized air to be fed to the cylinder 53 which then moves rod 52 downwardly causing arms 44 and 45 to swing so as to bring the dies 56 and 57 into the ears 21. After reaching an inner moving limit as determined by the desired shape of the die and ear the valve 109 is caused to shift to feed pressurized air to the other side of the cylinder 53 and move rod 52 upwardly to cause dies 56 and 57 to be moved to the open position.

The timing of all of the above operations may be made in many ways, however, a simple recycling timer actuated by an electrical impulse fed through ear activated switches 99 arranged in series to cause the timer to be actuated to program, as desired, all the above operations. Limit switches, not shown, may be arranged to determine the maximum extent of movement of the various components. Such means are conventional and form no part of this inventive concept except to indicate that the apparatus of this invention may be operated in several manners and with cycles adapted for the type and style of eared containers in which it is desired to have reshaped ears.

Method of reshaping

In the method of reshaping the ears of eared container the following steps are included:

*advancing* an eared container in the way of reshaping die means;

*contacting* sensing means by the ears to cause actuation of a sequencing cycle of operations;

*lifting* the container by its ears to an oriented and predisposed position;

*advancing* and *expanding* a bolster means to engage the eared container on its inner surface and adjacent each ear;

*moving* an ear reshaping die to and beyond the original outer surface of an ear of the container;

*returning* the reshaping die to an at-rest position;

*collapsing* and *withdrawing* the bolster from within the container;

*lowering* the container to a discharge position; and

*removing* the container from the reshaping means.

The terms "up," "down," "in," "out," "left," "right" and similar terms are applicable to the apparatus as described in conjunction with the accompanying drawings and it is to be noted that such terms are merely for the purpose of description and do not necessarily apply to a position in which the apparatus may be constructed or used.

While I have herein shown and described my invention in which I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention herein, what I claim as new and desire to secure by Letters Patent is:

1. Apparatus for the reshaping of ears on eared containers such as metal containers and the like, the apparatus comprising: (a) a frame including a passageway therethrough for the passage of an eared container; (b) means for conveying an eared container to and through the frame; (c) means for orienting the container by its ears and so that the ears and the container are brought into the frame at a predetermined relationship to the frame; (d) means for bringing the ears of/and the eared container to a precise position in the frame; (e) means for actuating the mechanism of the apparatus in response to a signal; (f) means for moving a pair of oppositely disposed reshaping dies toward each other and with the facing portions in part being advanced to and beyond the original outer surface of the ears so as to reshape the ears of the container; and (g) means for releasing and moving the reshaped eared container from the apparatus.

2. Ear reshaping apparatus as in claim 1 in which there is provided an internal bolster mechanism adapted to be moved into the open top of the eared container, said bolster mechanism including means for advancing the boslter a determined amount into the open top of the eared container; means for moving portions of the bolster into supporting engagement with the internal surface of the container and against those portions that contain the ears and at least those portions adjacent the ears so as to support the ears and adjacent container wall during the inward movement of the ear reshaping dies; and means for moving the wall engaging portions of the bolster from their respective supporting positions and means for returning the bolster mechanism to collapsed position out of the path of the movement of the container.

3. Ear reshaping apparatus as in claim 2 in which the means for bringing the ears of the eared container to a precise position includes means for engaging each ear to stop and orient the eared container; means for cradling the engaged ear and for lifting the cradled ear and eared container to a precise position; means for lowering the eared container; and means for releasing the ears of the eared container.

4. Ear reshaping apparatus as in claim 3 in which the means for bringing the ears of the eared container to a precise position additionally includes a means for sensing said ears as the container is advanced into the frame and in which the means for actuating the mechanism is a signal in response to an actuation of the sensing means.

5. Ear reshaping apparatus as in claim 4 in which the means for engaging, cradling and lifting includes a first pivoted arm mounted on the frame; an arm end carried on the outer portion of the pivoted arm, the arm end normally disposed to engage the ear of the eared container as it is advanced into the apparatus; means for swinging the arm in the pivot so the end is moved from the path of the ear as the container is discharged from the apparatus; an inner second arm pivoted on the frame and having a distal end adapted to be swung into engagement with the ear; and means for swinging the arm a determined amount so as to lift the ear to a precise position.

6. Ear reshaping apparatus as in claim 5 in which the means for sensing the ears includes an ear sensing plate carried by the arm end and adapted to be normally disposed a short distance before the arm end, the sensing plate movable by an engaging ear toward and to the arm end; means carried by the arm end for actuating a signal in response to movement of the sensing plate the signal adapted to cause the ear reshaping apparatus to be activated.

7. Ear reshaping apparatus as in claim 6 in which the means for engaging cradling and lifting further includes a biasing means attached to and disposed so as to urge the arm end and sensing plate in the way of the ear; means for engaging the first pivoted arm and overcoming the biasing means so as to swing the arm end and sensing plate from in the way of the ear said means responsive to a times actuation; and biasing means attached to and urging the distal end of the inner second arm to a nonlift position; and means for engaging and rotating the inner second arm to lift the ear to the precise ear reshaping position said means being responsive to a times sequence actuation.

8. Ear reshaping apparatus as in claim 7 in which the biasing means are springs and in which the means for engaging both the first and second arms are hydraulic cylinders.

9. Ear reshaping apparatus as in claim 6 in which the means for actuating a signal is a pneumatic conductor carrying a low volume of pressurized air and having a tube end disposed adjacent the inner surface of and adapted to be closed by the ear sensing plate as it is moved by the advancing ear of the eared container; and a pneumatically actuated switch adapted to be activated in response to the closing of the end of the tube.

10. Ear reshaping apparatus as in claim 4 in which the means for moving a pair of reshaping dies includes a pair of die arms; a pair of pivot pins mounted in the frame each engaging and pivotally retaining a die arm intermediate its ends; an ear reshaping die removably mounted in one end of each of the die arms; a toggle arm attached to the other end of each of the die arms; and means for moving each of the toggle arms to swing the die arms so as to move the dies toward and into the ears and to move the dies away from and from the way of the ear.

11. Ear reshaping apparatus as in claim 10 in which the means for moving the toggle arms is a hydraulic cylinder moved in response to the signal generated in response to the actuation of the sensing means.

12. Ear reshaping apparatus as in claim 2 in which the bolster mechanism includes a support shaft upon which is carried the bolster mechanism; means to raise and lower the support shaft and attached bolster mechanism; an upper link retaining member slidably retained on the shaft; a pair of links each attached by one end to the uper link retaining member; a bolster body pivotally attached to the other end of each link the bolster body having an outwardly facing portion adapted to engage and support the inner diameter of the container; biasing means for urging the links and bolster bodies toward a collapsed position; means to limit the collapsed position of the bolster mechanism; means for limiting the downward movement of the bolster bodies into the container; means for pushing the link retaining member further toward the container to swing each of the links so to move each of the bolsters outwardly to engage and support the container and ears during the reshaping of the ears; and means for collapsing the bolsters before and during the lifting of the bolster mechanism from the container and from in the way of the container.

13. Ear reshaping apparatus as in claim 12 in which the bolster mechanism additionally includes a lower pivot block carried on the shaft; a pair of links each having one end connected to the lower pivot block and the other end connected to the lower portion of one of the bolster bodies; and the means for limiting the collapsing position includes a stop adapted to limit the space between the bolster and the shaft.

14. The method of reshaping the ears of an eared container comprising the following steps:

*advancing* an eared container into reshaping apparatus and in the way of ear reshaping means;

*contacting* by the ears of the container a sensing means which when activated causes an actuation of a sequencing cycle of operations;

*lifting* the container by its ears to an oriented and predisposed position;

*advancing* a collapsed bolster means to a position within the lifted ears container and *expanding* the bolster means to engage the eared container on its inner surface and adjacent each ear;

*moving* an ear reshaping die toward and beyond the outer surface of an ear of the container;

*returning* the reshaping die to an at-rest position out of the path of the ear of the container;

*collapsing* and *withdrawing* the bolster from within the container;

*lowering* the container to a discharge position; and

*removing* the container from the reshaping apparatus.

15. The method of reshaping the ears of an eared container as in claim 14 and including the additional steps of:

*orienting* the eared container by its ears and with said ears substantially at right angles to the path of the container;

*reforming* each ear by the advancing of a die so that the ear is reshaped in conformity with die and with selected and desired sloped and shaped surfaces; and

*disengaging* the ear contacting and lifting means from the lowered container so that the container may be removed from the apparatus.

16. The method of reshaping the ears of an eared container as in claim 15 and including the additional steps of:

*stopping* the advancement of the eared container by placing a stop means in the way of the ears of the advancing container;

*sensing* the presence of the ears of the oriented and stopped container; and

*activating* a sequencing of the apparatus in response to the sensing of the ears.

References Cited
UNITED STATES PATENTS

| | | | |
|---|---|---|---|
| 2,456,506 | 12/1948 | Henchert | 113—1 |
| 3,170,592 | 2/1965 | Ullman et al. | 220—91 |
| 3,170,593 | 2/1965 | Ullman et al. | 220—91 |
| 3,202,311 | 8/1965 | Heisler | 220—91 |
| 3,241,578 | 3/1966 | Heisler | 140—93 |

RICHARD J. HERBST, *Primary Examiner.*